(12) United States Patent
Yeh et al.

(10) Patent No.: US 9,444,965 B2
(45) Date of Patent: Sep. 13, 2016

(54) SCAN DEVICE

(71) Applicants: Sintai Optical (Shenzhen) Co., Ltd., Shenzhen, Guandong Province (CN); Asia Optical Co., Inc., Taichung (TW)

(72) Inventors: Yun-Min Yeh, Taichung (TW); Hsien-Chi Lin, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 14/791,695

(22) Filed: Jul. 6, 2015

(65) Prior Publication Data

US 2016/0021275 A1  Jan. 21, 2016

(30) Foreign Application Priority Data

Jul. 21, 2014 (TW) .............................. 103124884 A

(51) Int. Cl.
  *H04N 1/04* (2006.01)
  *H04N 1/028* (2006.01)
  *H04N 1/024* (2006.01)

(52) U.S. Cl.
  CPC ...... *H04N 1/02895* (2013.01); *H04N 1/02481* (2013.01)

(58) Field of Classification Search
  CPC .................. H04N 1/02895; H04N 1/02481
  USPC .................. 358/474, 481, 493, 498
  See application file for complete search history.

(56) References Cited

U.S. PATENT DOCUMENTS

| | | | | |
|---|---|---|---|---|
| 4,812,917 A * | 3/1989 | Suzuki | ..................... | H04N 1/03 358/451 |
| 6,339,214 B1 * | 1/2002 | Takakura | ................. | H04N 1/03 250/208.1 |
| 7,280,256 B2 * | 10/2007 | Maurer | .................... | H04N 1/04 358/471 |
| 2014/0300936 A1 * | 10/2014 | Yang | .................... | H04N 1/0285 358/475 |

* cited by examiner

*Primary Examiner* — Houshang Safaipour
(74) *Attorney, Agent, or Firm* — McClure, Qualey & Rodack, LLP

(57) ABSTRACT

A scan device includes a main body, a transparent glass plate, a carrier, a light source, a reflecting unit, a lens and an image sensor. Light is emitted from the light source through the transparent glass plate to a document. Then, the light is reflected by the document and passes through the transparent glass plate to reach the reflecting unit. The light is reflected by the first mirror to travel to the second mirror and the third mirror and reflected by the second and third mirrors for several times, then reaches the fourth mirror and fifth mirror to passes through the lens, and forms an image on the image sensor.

14 Claims, 7 Drawing Sheets

SCAN DEVICE

BACKGROUND OF THE INVENTION

1. Field of the Invention

The invention relates to a scan device, and more particularly to a scan device including a pair of reflecting elements parallel disposed for reflecting light therebetween so as to increase a total optical path length.

2. Description of the Related Art

Conventional scan devices utilize a light source providing light for a document, and the light is reflected by the document to enter a reflecting unit including a plurality of reflecting elements. The reflecting elements reflect the light to an image sensor which converts the light into electronic signals. The electronic signals are further converted into a digital image by software.

Referring to FIG. 1, a conventional scan device is disclosed. The conventional scan device includes a carrier 150, a light source 160, a reflecting mirror 170, a first mirror 180, a second mirror 190, a third mirror 110, a fourth mirror 111, a fifth mirror 112, a lens 113 and a image sensor 114. Light emitted from the light source 160 is reflected by the reflecting mirror 170. The reflected light passes through a glass plate 140 to a document 130. The document 130 reflects the light into the carrier 150 to become a light beam L1. The light beam L1 is reflected to the second mirror 190 by the first mirror 180 to form a light beam L2. The light beam L2 is reflected to the third mirror L3 by the second mirror 190. The light beam L2 is further reflected by the third mirror 110 and the fourth mirror 111 to pass through a grating 115 and reach the fifth mirror 112. The light is reflected by the fifth mirror 112 to become a light beam L3 which passes through the lens 113 and forms an image on the image sensor 114. The fourth mirror 111 is disposed in the carrier 150 and positioned at an upper left corner by an angle of 45° with respect to the document 130. Light is reflected by the fourth mirror 111 and travels parallel to an axis to pass through the grating 115 and reach the fifth mirror 112. The fifth mirror 112 is disposed in the carrier 150 and positioned at a lower left corner by an angle of 45° with respect to the document 130. The light beam L3 is reflected by the fifth mirror 112 and enters the lens 113 and the image sensor 114. The described structure prevents undesired light from entering the lens 113 and the image sensor 114 through the fifth mirror 112 so as to avoid the light to overlap the image. In addition, the described structure can also decrease the total volume of the entire scan device.

As the scan device is developed to be more compact, it is an important object to have a better image quality even optical elements are disposed in a limited space. In a limited space, a total optical path length is increased by adding more reflecting elements, which increases a depth of field to obtain better image quality even for a document with folds. In addition, the undesired light is prevented to enter the lens to overlap the image formed on the image sensor.

BRIEF SUMMARY OF THE INVENTION

The object of the invention is to provide a scan device including a pair of parallel disposed mirrors to reflect light therebetween so as to increase an optical path length of the scan device.

The invention provides a scan device. The scan device configured to scan a document in accordance with an exemplary embodiment of the invention includes a main body; a transparent plate disposed in the main body and configured to bear the document; a carrier disposed in the main body and including an incident hole; a light source disposed on the carrier; a reflecting unit disposed in the carrier; an image capturing lens set disposed in the carrier; and an image sensor disposed in the carrier. The reflecting unit includes: a first mirror including a first normal line and a first reflecting side facing the transparent plate; a second mirror including a second normal line and a second reflecting side facing the first reflecting side; a third mirror including a third normal line and a third reflecting side facing the second reflecting side to form a reflecting space therebetween; a fourth mirror including a fourth normal line and a fourth reflecting side facing the third reflecting side; and a fifth mirror including a fifth normal line and a fifth reflecting side facing the fourth reflecting side. Light from the light source passes through the transparent plate to reach the document, the document reflects the light to reach the first mirror through the reflecting space, the first mirror reflects the light to enter the reflecting space, the light is reflected between the second mirror and the third mirror several times in the reflecting space before the light leaves the reflecting space, the light leaves the reflecting space and reaches the fourth mirror, the light is reflected by the fourth mirror to reach the fifth mirror, the fifth mirror reflects the light to pass through the image capturing lens set so as to form an image on the image sensor, an angle between the fourth normal line and the document is greater than or equal to 220° and less than or equal to 230°, and an angle between the fifth normal line is greater than or equal to 130° and less than or equal to 140°.

In another exemplary embodiment, the second mirror is parallel to the third mirror.

In yet another exemplary embodiment, an angle between the first normal line and the document is 45°, an angle between the second normal line and the document is 175°, and an angle between the third normal line and the document is −5°.

In another exemplary embodiment, the fourth mirror is disposed in a position not near a rear extension direction of the second mirror so that when the light reflected by the document passes through the transparent plate to reach the first mirror and the light is incident on the first mirror by an angle other than 45° with respect to the first normal line, the light reflected by the second mirror and the third mirror does not reach the fourth mirror.

In yet another exemplary embodiment, a distance between the fifth mirror and the light source is greater than a distance between the first mirror and the light source, a distance between the second mirror and the light source, a distance between the third mirror and the light source, and a distance between the fourth mirror and the light source respectively.

In another exemplary embodiment, the light source is fixed to an outer surface of the carrier and near the incident hole.

In yet another exemplary embodiment, the document includes a first size corresponding to a first distance between the second mirror and the third mirror.

In another exemplary embodiment, the document includes a second size corresponding to a second distance between the second mirror and the third mirror, and the second size is greater than the first size.

In yet another exemplary embodiment, an angle between the third normal line and the fourth normal line is 135°.

In another exemplary embodiment, a summation of an incident angel of the light on the fourth mirror and an incident angle of the light on the fifth mirror is greater than or equal to 80° and less than or equal to 100°.

In yet another exemplary embodiment, the transparent plate is a transparent glass plate.

The scan device configured to scan a document in accordance with another exemplary embodiment of the invention includes a main body; a transparent plate disposed in the main body and configured to bear the document; a carrier disposed in the main body and including an incident hole; a light source disposed on the carrier; a reflecting unit disposed in the carrier; an image capturing lens set disposed in the carrier; and an image sensor disposed in the carrier. The reflecting unit includes: a first mirror including a first normal line and a first reflecting side facing the transparent plate; a second mirror including a second normal line and a second reflecting side facing the first reflecting side; and a third mirror including a third normal line and a third reflecting side facing the second reflecting side to form a reflecting space therebetween. Light from the light source passes through the transparent plate to reach the document, the document reflects the light to reach the first mirror through the reflecting space, the first mirror reflects the light to enter the reflecting space, the light is reflected between the second mirror and the third mirror several times in the reflecting space before the light leaves the reflecting space, the light leaves the reflecting space and passes through the image capturing lens set so as to form an image on the image sensor.

In another exemplary embodiment, the second mirror is parallel to the third mirror.

In yet another exemplary embodiment, the light source is fixed to an outer surface of the carrier and near the incident hole.

In another exemplary embodiment, the document includes a third size corresponding to a third distance between the second mirror and the third mirror.

In yet another exemplary embodiment, the document comprises a fourth size corresponding to a fourth distance between the second mirror and the third mirror, and the fourth size is greater than the third size.

In another exemplary embodiment, an angle between the first normal line and the document is 45°, an angle between the second normal line and the document is 175°, and an angle between the third normal line and the document is −5°.

In yet another exemplary embodiment, the image capturing lens set disposed in a second non-reflecting side of the second mirror.

In another exemplary embodiment, the carrier has a carrier cover, and the incident hole is on the carrier cover.

In yet another exemplary embodiment, an angle between the first normal line and the document is 45°.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
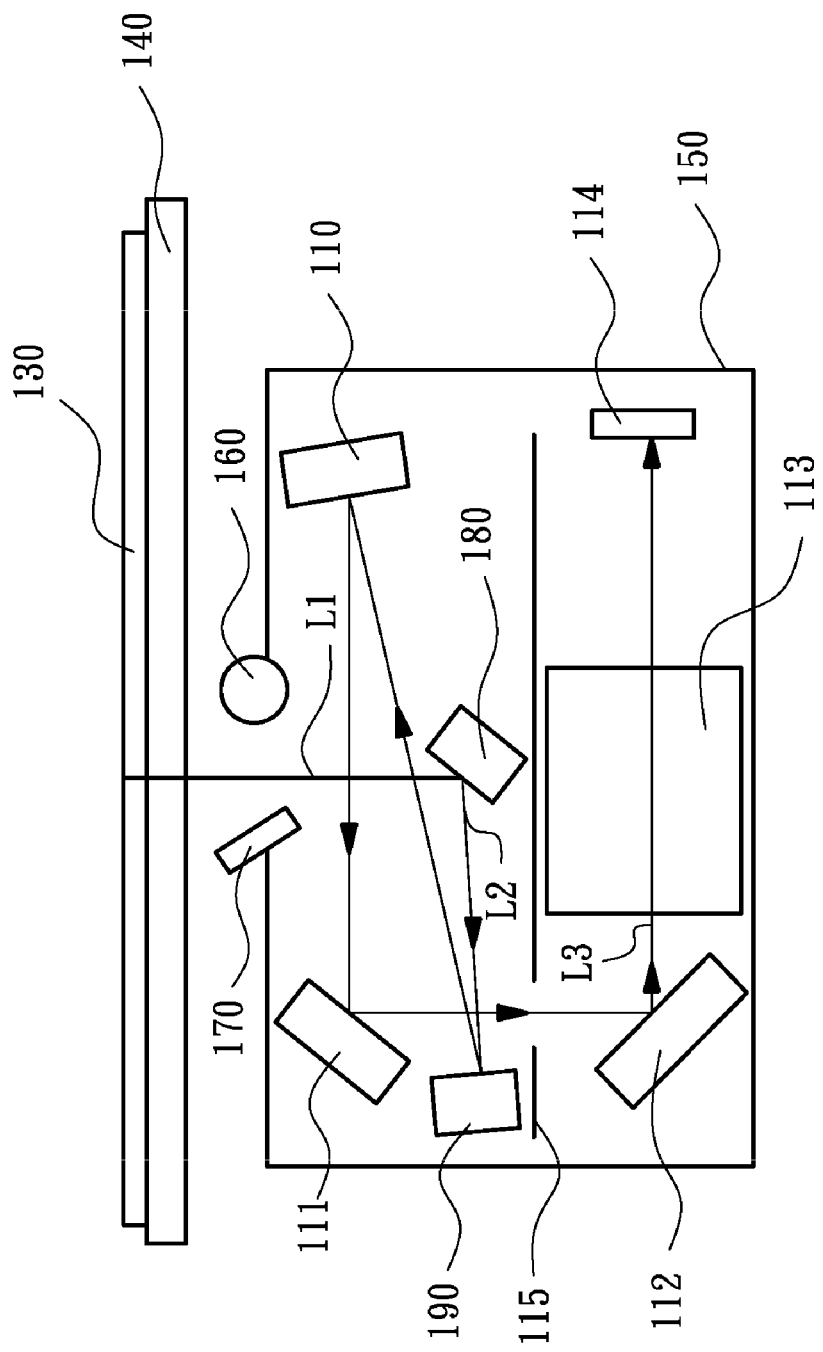
FIG. 1 is a schematic view of a conventional scan device.
Figure 2:
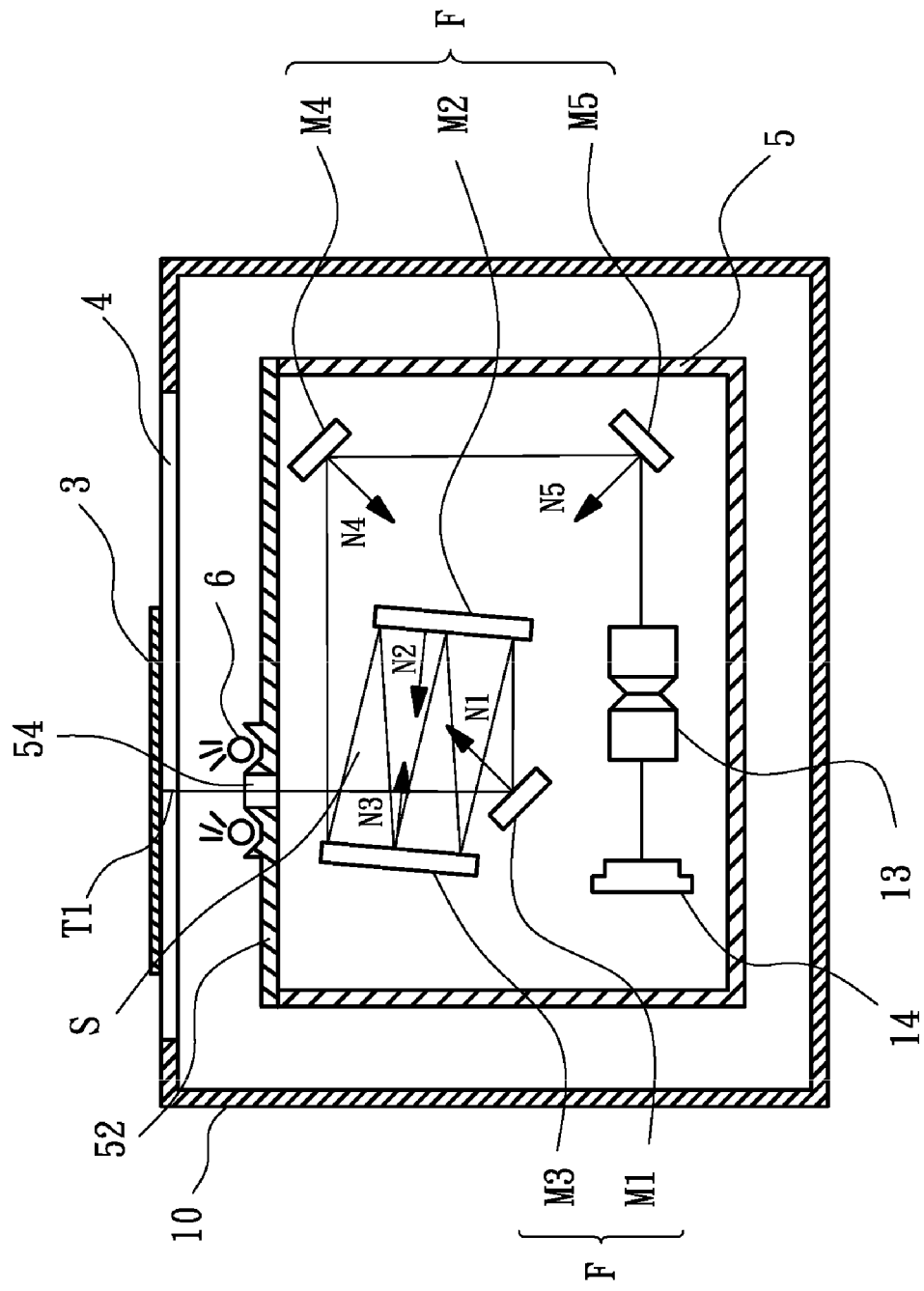
FIG. 2 is a schematic view of an embodiment of a scan device of the invention.

Referring to FIG. 2, a scan device of the invention includes a main body 10, a transparent glass plate 4, a carrier 5, a light source 6, a reflecting unit F, an image capturing lens set 13 and an image sensor 14. Their structures are described as follows.

The transparent glass plate 4 is disposed on one side of the main body 10. A document 3 which is to be scanned is placed on the transparent glass plate 4. The carrier 5 is disposed in the main body 10. The carrier 5 is covered y a carrier cover 52 to prevent unnecessary light from entering the carrier 5 so as to obtain a better scan quality. The carrier cover 52 has an incident hole 54, and the light source 6 is disposed on the carrier cover 52 and near the incident hole 54. The reflecting unit F, the image capturing lens set 13 and the image sensor 14 are disposed within the carrier 5.

The reflecting unit F includes a first mirror M1 having a first reflecting side and a first normal line N1, a second mirror M2 having a second reflecting side and a second normal line N2, a third mirror M3 having a third reflecting side and a third normal line N3, a fourth mirror M4 having a fourth reflecting side and a fourth normal line N4 and a fifth mirror M5 having a fifth reflecting side and a fifth normal line N5. The transparent glass plate 4 faces the first reflecting side of the first mirror M1. The second mirror M2 faces the first reflecting side of the first mirror M1. The third mirror M3 is parallel with the second mirror 2 to form a reflecting space S therebetween. The fourth mirror M4 faces the third reflecting side of the third mirror M3. The fifth mirror M5 faces the fourth reflecting side of the fourth mirror M4. The image sensor 14 can be charge coupled device (CCD) or complementary metal-oxide-semiconductor (CMOS).

Light from the light source 6 passes through the transparent glass plate 4 to reach the document 3. A light T1 reflected by the document 3 passes through the transparent glass plate 4 and the reflecting space S to reach the first mirror M1. The first mirror M1 reflects the light T1 to enter the reflecting space S and reach the second mirror M2. The light T1 is reflected between the second mirror M2 and the third mirror M3 six times in the reflecting space S before the light T1 leaves the reflecting space S. Afterwards, the light T1 leaves the reflecting space S to reach the fourth mirror M4 and is reflected by the fourth mirror M4 to reach the fifth mirror M5. The fifth mirror M5 reflects the light T1 to pass through the image capturing lens set 13 so as to form an image on the image sensor 14.

In this embodiment, an angle between the first normal line N1 and the document 3 is 45°, an angle between the second normal line N2 and the document 3 is 175°, an angle between the third normal line N3 and the document 3 is −5°, an angle between the fourth normal line N4 and the document 3 is 225°, and an angle between the fifth normal line N5 and the document 3 is 135°. An angle between the third normal line N3 and the fourth normal line N4 is 135°. A summation of an incident angel of the light on the fourth mirror M4 and an incident angle of the light on the fifth mirror M5 is 90°. Because the light T1 is reflected by the fifth mirror M5 to enter the image capturing lens set 13, the fifth mirror M5 is preferably placed in a position at lower right corner of the carrier 5 which is farthest from the incident hole 54 to prevent undesired light from entering the image capturing lens set 13 and the image sensor 14. The light received by the image sensor 14 is parallel with the document 3 through regulation of the positions and angles of the reflecting unit F and the image sensor 14. The total optical path length is also increased.

Figure 3:
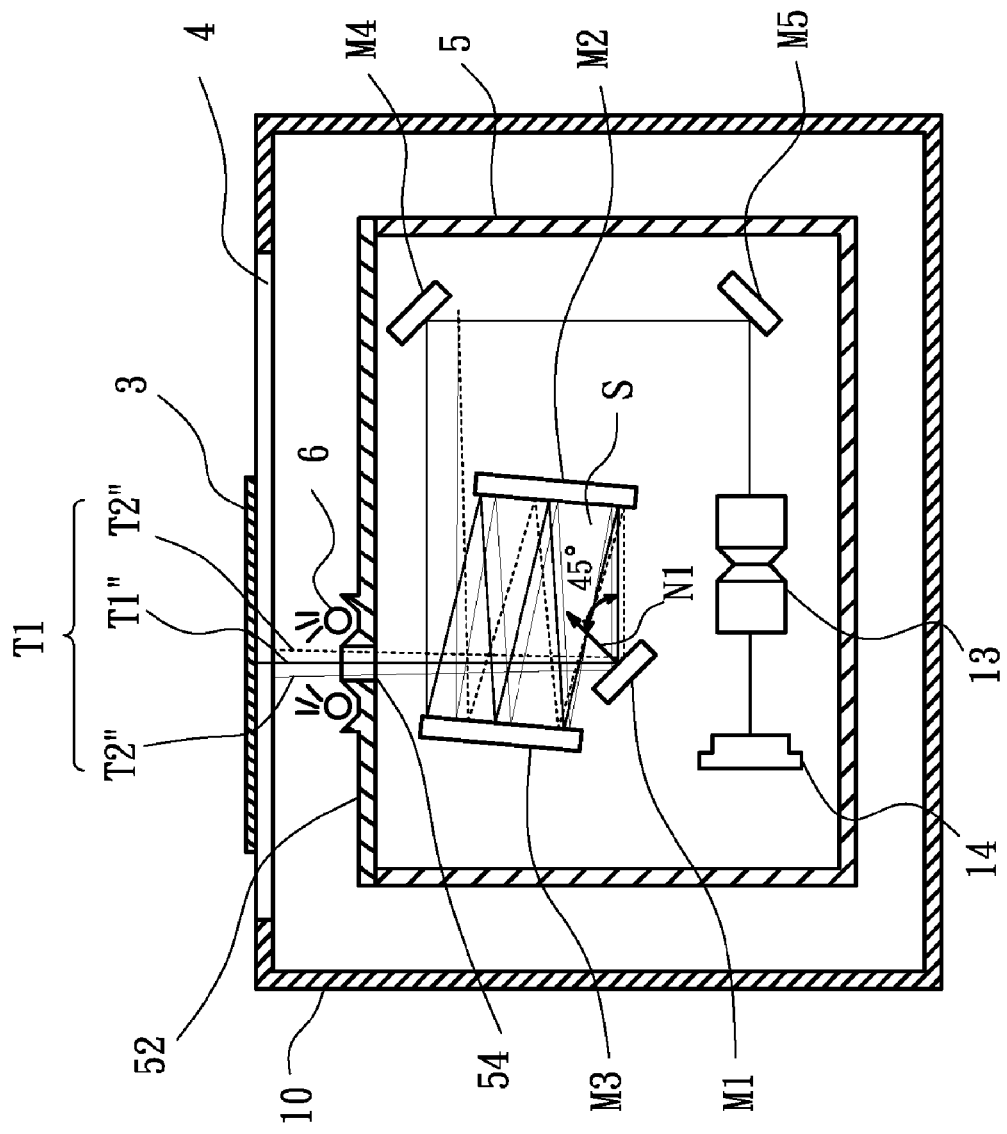
FIG. 3 depicts several optical paths of the scan device of FIG. 2.
Figure 4:
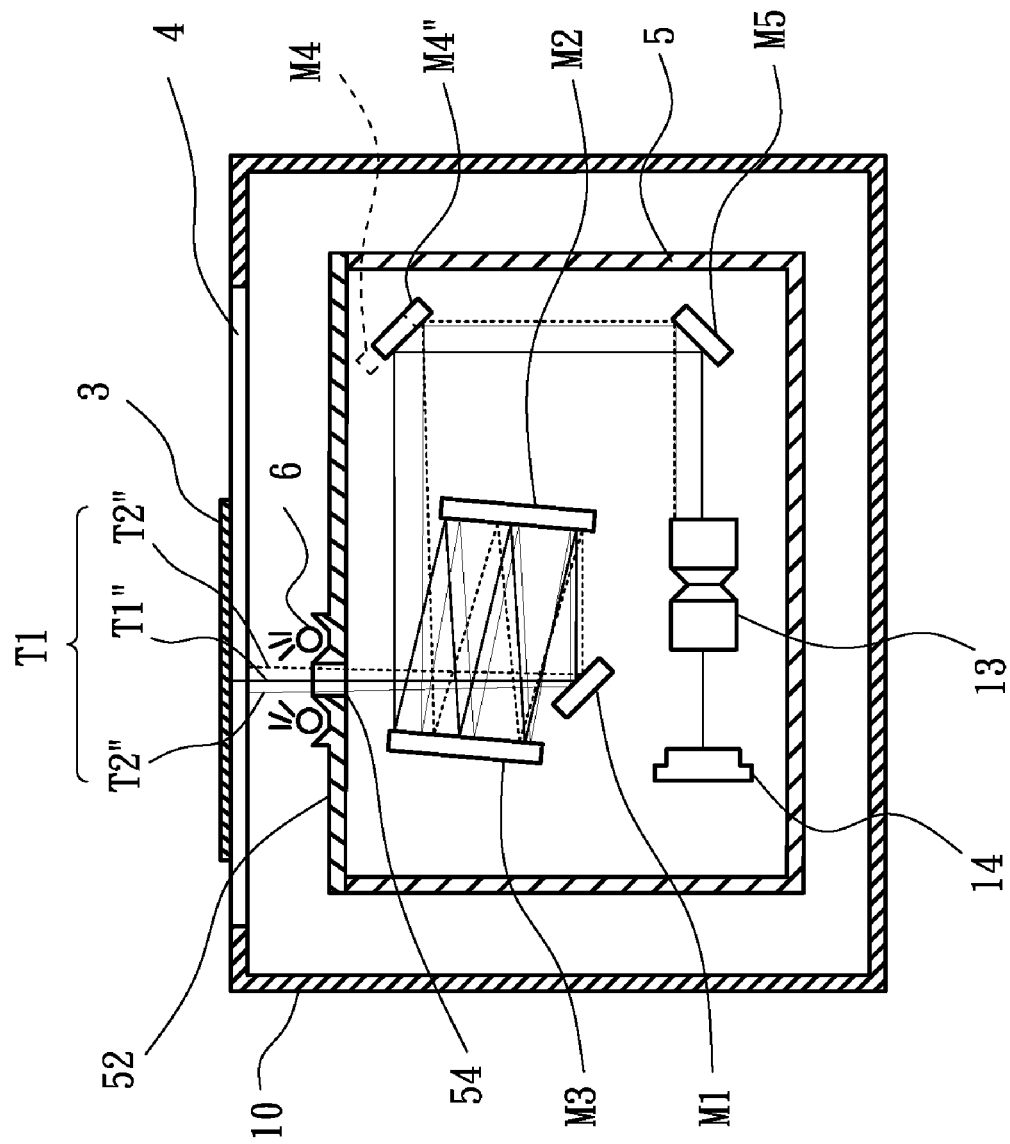
FIG. 4 depicts a fourth mirror of the scan device of FIG. 2 preventing undesired light from entering an image sensor.

The optical path of the scan device is further described. Referring to FIG. 3, light from the light source 6 passes through the transparent glass plate 4 to reach the document 3. The light T1 reflected by the document 3 enters the reflecting unit F. The light T1 is divided into a incident light T1" which has a incident angle of 45° with respect to the first normal line N1 of the first mirror M1 and an incident light T2" which has a incident angle other than 45° with respect to the first normal line N1. When the incident light T1" is reflected by the first mirror M1, the reflected incident light T1" propagates horizontally to enter the reflecting space S and is reflected between the second mirror M2 and the third mirror M3 repeatedly before it leaves the reflecting space S. The incident light T1" leaves the reflecting space S and is reflected by the fourth mirror M4 and the fifth mirror M5 to propagate horizontally to enter the image capturing lens set 13 and the image sensor 14. When the incident light T2" is reflected by the first mirror M1, the reflected incident light T2" propagates nearly horizontally to enter the reflecting space S and is reflected between the second mirror M2 and the third mirror M3 repeatedly before it leaves the reflecting space S. When the incident light T2" leaves the reflecting space S, it cannot reach the fourth mirror M4 due to reflection condition of the first mirror M1, the second mirror M2 and the third mirror M3 and finally cannot enter the image capturing lens set 13 and the image sensor 14. It is noted that the fourth mirror M4 cannot be disposed near a rear extension direction of the second mirror M2 to prevent the fourth mirror M4 from reflecting the undesired incident light T2". Referring to FIG. 4, a fourth mirror M4" is disposed in an improper position which is in the rear extension direction of the second mirror M2, and the fourth mirror M4 which is in a proper position is shown in a dashed line for reference. When the incident light T2" is reflected by the first mirror M1 to propagate nearly horizontally and enter the reflecting space S where the incident light T2" is reflected between the second mirror M2 and the third mirror M3, the undesired incident light T2" possibly reaches the fourth mirror M4" and even enters the image capturing lens set 13 and the image sensor 14 to generate an overlapped image due to the improperly disposed fourth mirror M4". The undesired incident light T2" never reaches the fourth mirror M4 which is not near the rear extension direction of the second mirror M2.

Figure 5:
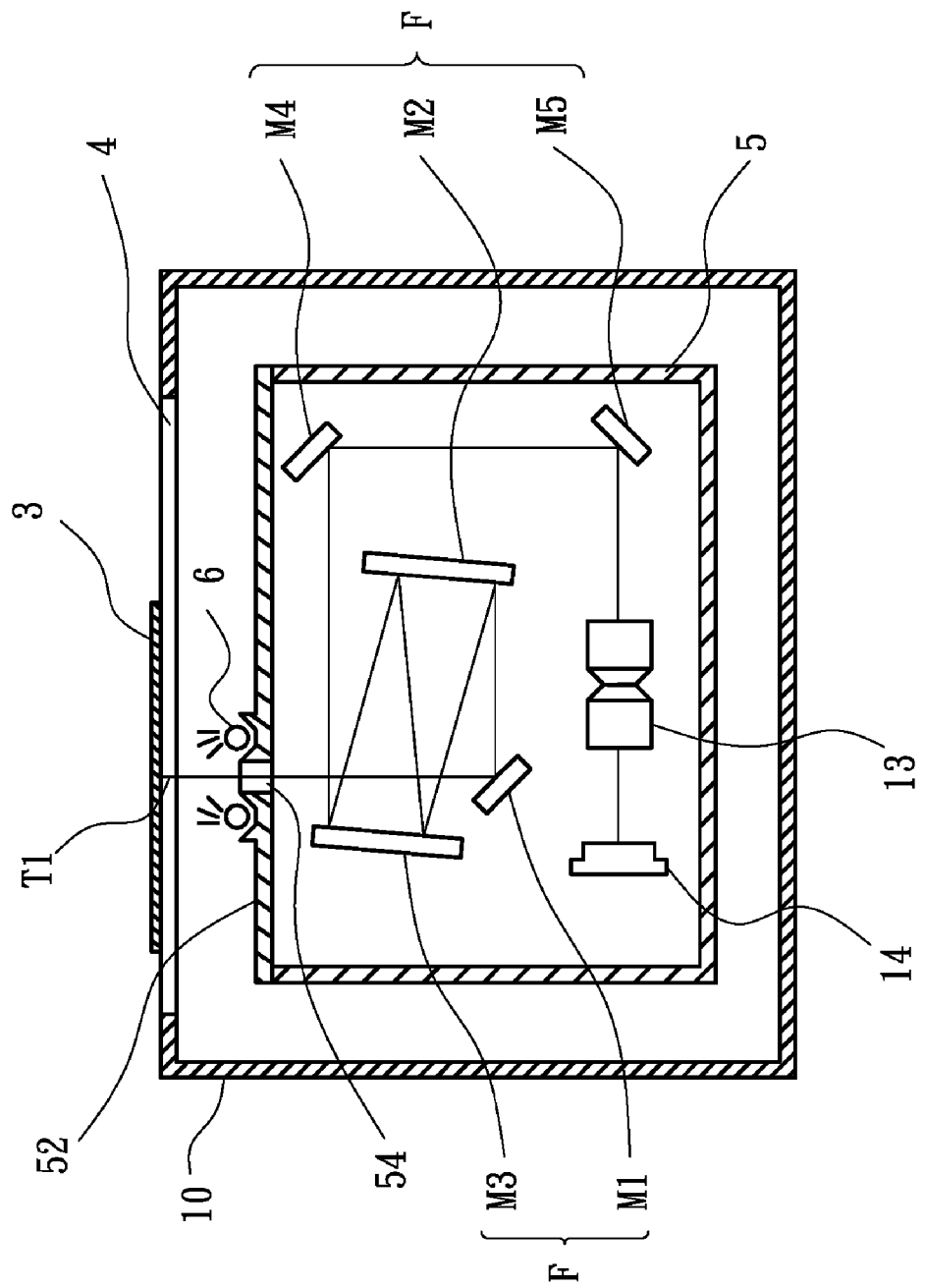
FIG. 5 is a schematic view of another embodiment of a scan device of the invention.

Referring to FIG. 5, another embodiment of the scan device of the invention is shown. This embodiment has a structure similar to the embodiment of FIGS. 2 to 4, but the number of reflection between the second mirror M2 and the third mirror M3 of this embodiment is two less than the embodiment of FIGS. 2 to 4. The distance between the second mirror M2 and the third mirror M3 is increased under condition that the angles of the second mirror M2 and the third mirror M3 are constant to increase light travel length and decrease the number of reflection. Therefore, the second mirror M2 is separated from the third mirror M3 by a first distance in the scan device of FIGS. 2 to 4, which is suitable for documents of a first size, and the second mirror M2 is separated from the third mirror M3 by a second distance in the scan device of this embodiment, which is suitable for documents of a second size. Since the second distance is larger than the first size, the second size, such as A3 size, is larger than the first size, such as A4 size.

Figure 6:
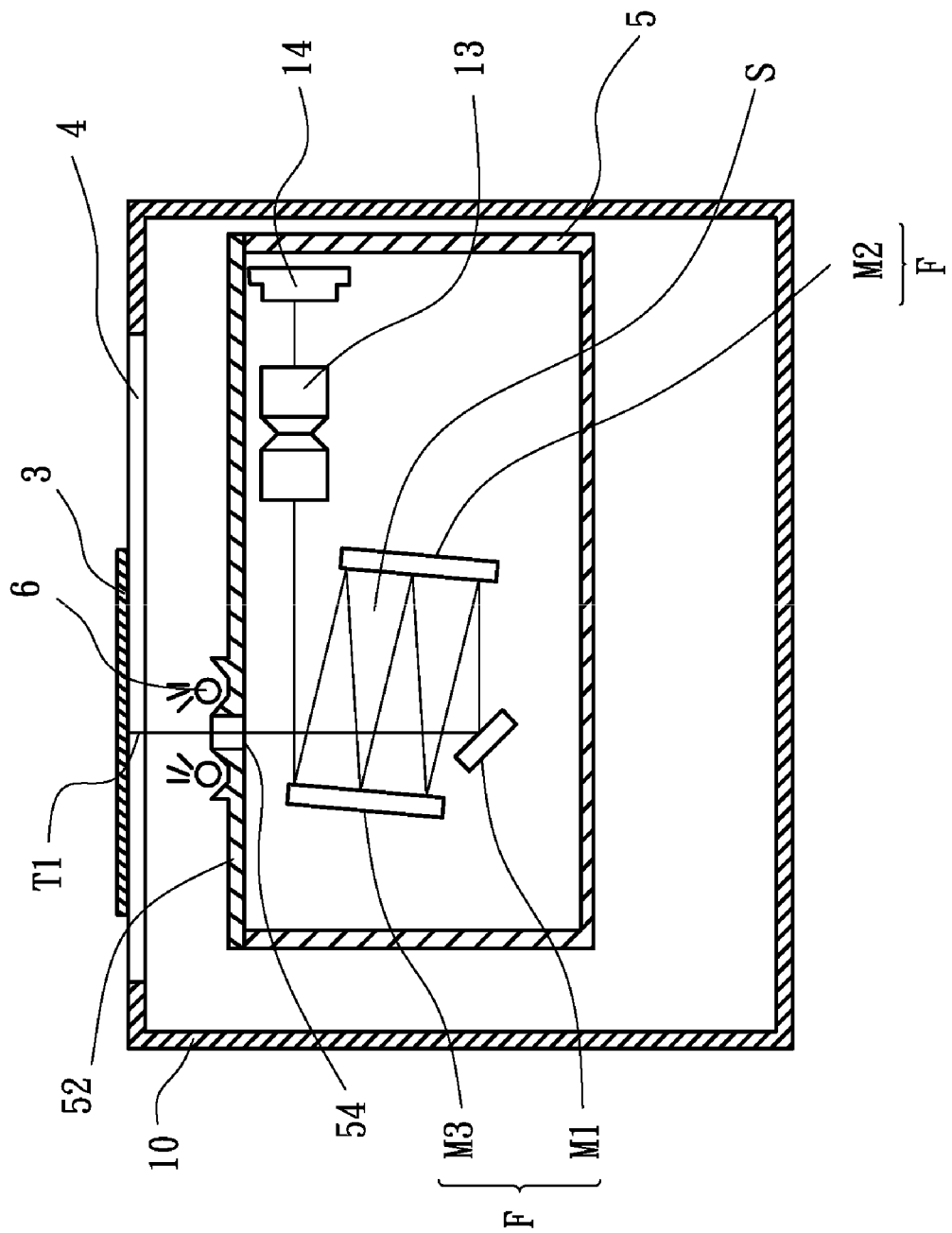
FIG. 6 is a schematic view of another embodiment of a scan device of the invention.

Referring to FIG. 6, another embodiment of the scan device of the invention is shown. This embodiment has a structure similar to the embodiment of FIGS. 2 to 4, but the fourth mirror and the fifth mirror are not necessary. When the light T1 leaves the reflecting space S formed by the second mirror M2 and the third mirror M3, the light T1 enters the image capturing lens set 13 and the image sensor 14 directly and forms an image on the image sensor 14. In this embodiment, the image capturing lens set is disposed far from the incident hole and near a non-reflecting side of the second mirror M2 so that light is prevented from entering the image capturing lens set directly and undesired light is not easy to enter the image capturing lens set.

Figure 7:
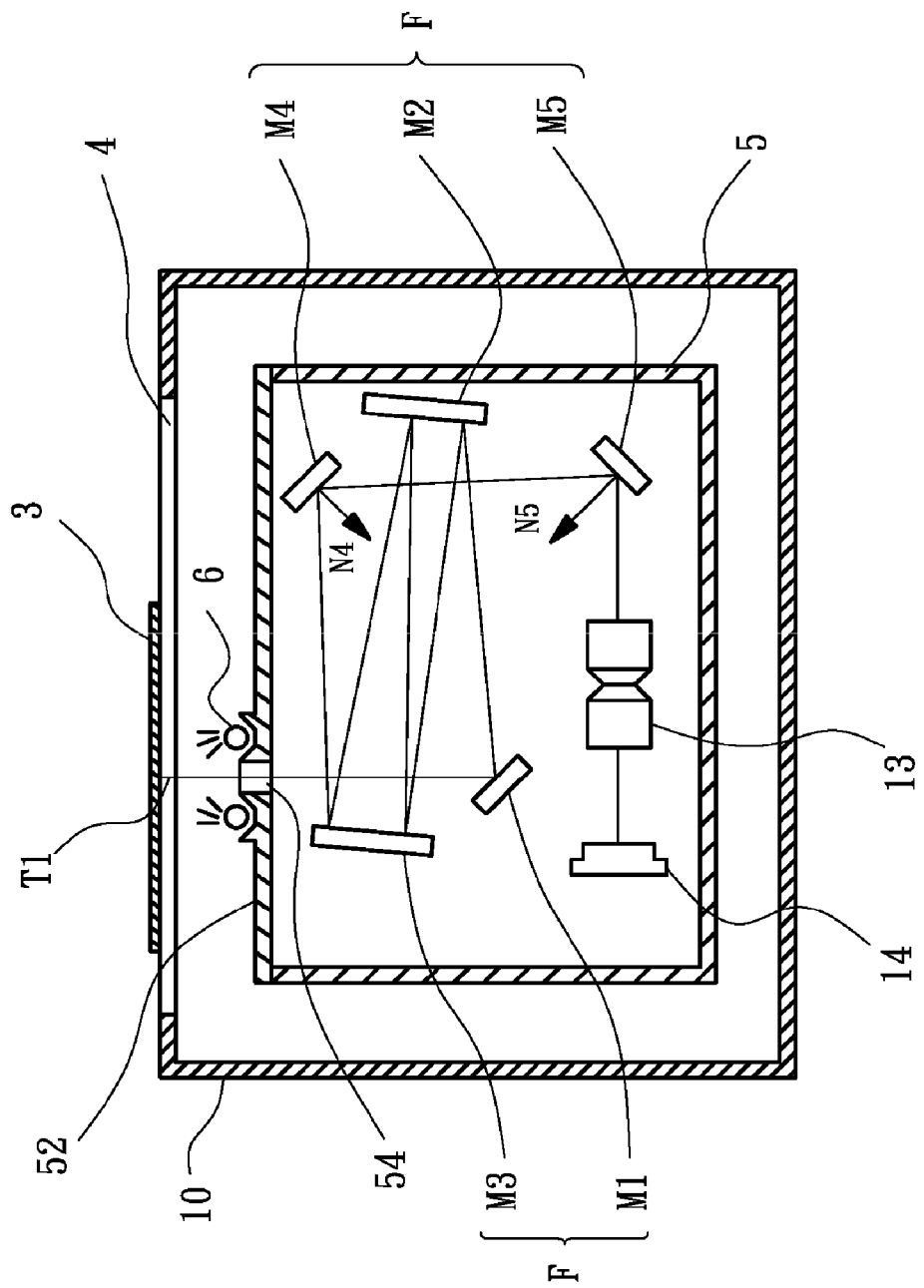
FIG. 7 is a schematic view of another embodiment of a scan device of the invention.

Referring to FIG. 7, another embodiment of the scan device of the invention is shown. This embodiment has a structure similar to the embodiment of FIGS. 2 to 4, but a distance between the second mirror M2 and the third mirror M3 is larger than a distance between the second mirror M2 and the fourth mirror M4. In this embodiment, the number of reflection between the second mirror M2 and the third mirror M3 is reduced under a constant total optical path length. The areas of the second mirror M2 and the third mirror M3 are reduced, and volume of the scan device is thus reduced.

Although an angle between the fourth normal line N4 of the fourth mirror M4 and the document 3 is 225°, and an angle between the fifth normal line N5 of the fifth mirror M5 is 135° in the described embodiments, it is understood that the angle between the fourth normal line N4 of the fourth mirror M4 and the document 3 can be less than or equal to 230° and greater than or equal to 220°, and the angle between the fifth normal line N5 of the fifth mirror M5 and the document 3 can be less than or equal to 140° and greater than or equal to 130° in other embodiments.

Although the summation of the incident angle on the fourth mirror and the incident angle of fifth mirror is 90° in the described embodiments, the summation of the incident angle on the fourth mirror and the incident angle of fifth mirror is greater than or equal to 80° and less than or equal to 100° in other embodiments.

The reflection angles of the second mirror M2 and the third mirror M3 are set through the parallel arrangement, whereby the number of reflection between the second mirror M2 and the third mirror M3 is increased so as to regulate the total optical path length. The light received by the image sensor becomes parallel to the document through regulation of other mirrors. Thus the final design angles of all mirrors are obtained. The advantages of the structure of the scan device of the invention are as follows. (1) The total optical path length is increased so as to increase a depth of field to obtain better image quality even for a document with folds, whereby it is suitable for various modules through regulation of distances of all mirrors. (2) A mirror is prevented to be placed in the rear extension direction of another mirror, whereby undesired light is avoided to enter the image capturing lens set and the image sensor. (3) The fifth mirror is placed as far away from the incident hole as possible to prevent the incident light from being reflected by the fifth mirror M5 to enter the image capturing lens set directly.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A scan device configured to scan a document, comprising:
   a main body;
   a transparent plate disposed in the main body and configured to bear the document;
   a carrier disposed in the main body and comprising an incident hole;
   a light source disposed on the carrier;
   a reflecting unit disposed in the carrier and comprising:
   a first mirror comprising a first normal line and a first reflecting side facing the transparent plate;
   a second mirror comprising a second normal line and a second reflecting side facing the first reflecting side;
   a third mirror comprising a third normal line and a third reflecting side facing the second reflecting side to form a reflecting space therebetween;
   a fourth mirror comprising a fourth normal line and a fourth reflecting side facing the third reflecting side; and
   a fifth mirror comprising a fifth normal line and a fifth reflecting side facing the fourth reflecting side;
   an image capturing lens set disposed in the carrier; and
   an image sensor disposed in the carrier, wherein light from the light source passes through the transparent plate to reach the document, the document reflects the light to reach the first mirror through the reflecting space, the first mirror reflects the light to enter the reflecting space, the light is reflected between the second mirror and the third mirror several times in the reflecting space before the light leaves the reflecting space, the light leaves the reflecting space and reaches the fourth mirror, the light is reflected by the fourth mirror to reach the fifth mirror, the fifth mirror reflects the light to pass through the image capturing lens set so as to form an image on the image sensor, an angle between the fourth normal line and the document is greater than or equal to 220° and less than or equal to 230°, and an angle between the fifth normal line is greater than or equal to 130° and less than or equal to 140°.

2. The scan device as claimed in claim 1, wherein the second mirror is parallel to the third mirror.

3. The scan device as claimed in claim 1, wherein an angle between the first normal line and the document is 45°, an angle between the second normal line and the document is 175°, and an angle between the third normal line and the document is −5°.

4. The scan device as claimed in claim 1, wherein the fourth mirror is disposed in a position not near a rear extension direction of the second mirror so that when the light reflected by the document passes through the transparent plate to reach the first mirror and the light is incident on the first mirror by an angle other than 45° with respect to the first normal line, the light reflected by the second mirror and the third mirror does not reach the fourth mirror.

5. The scan device as claimed in claim 1, wherein a distance between the fifth mirror and the light source is greater than a distance between the first mirror and the light source, a distance between the second mirror and the light source, a distance between the third mirror and the light source, and a distance between the fourth mirror and the light source respectively.

6. The scan device as claimed in claim 1, wherein the light source is fixed to an outer surface of the carrier and near the incident hole.

7. The scan device as claimed in claim 1, wherein the document comprises a first size corresponding to a first distance between the second mirror and the third mirror.

8. The scan device as claimed in claim 7, wherein the document comprises a second size corresponding to a second distance between the second mirror and the third mirror, and the second size is greater than the first size.

9. The scan device as claimed in claim 1, wherein an angle between the third normal line and the fourth normal line is 135°.

10. The scan device as claimed in claim 1, wherein a summation of an incident angel of the light on the fourth mirror and an incident angle of the light on the fifth mirror is greater than or equal to 80° and less than or equal to 100°.

11. The scan device as claimed in claim 1, wherein the transparent plate is a transparent glass plate.

12. A scan device configured to scan a document, comprising:
   a main body;
   a transparent plate disposed in the main body and configured to bear the document;
   a carrier disposed in the main body and comprising an incident hole;
   a light source disposed on the carrier;
   a reflecting unit disposed in the carrier and comprising:
   a first mirror comprising a first normal line and a first reflecting side facing the transparent plate;
   a second mirror comprising a second normal line and a second reflecting side facing the first reflecting side; and
   a third mirror comprising a third normal line and a third reflecting side facing the second reflecting side to form a reflecting space therebetween;
   an image capturing lens set disposed in the carrier; and
   an image sensor disposed in the carrier, wherein light from the light source passes through the transparent plate to reach the document, the document reflects the light to reach the first mirror through the reflecting space, the first mirror reflects the light to enter the reflecting space, the light is reflected between the second mirror and the third mirror several times in the reflecting space before the light leaves the reflecting space, and the light leaves the reflecting space and enters the image capturing lens set so as to form an image on the image sensor;
   wherein the document comprises a third size corresponding to a third distance between the second mirror and the third mirror;
   wherein the document comprises a fourth size corresponding to a fourth distance between the second mirror and the third mirror, and the fourth size is greater than the third size.

13. A scan device configured to scan a document, comprising:
   a main body;
   a transparent plate disposed in the main body and configured to bear the document;
   a carrier disposed in the main body and comprising an incident hole;
   a light source disposed on the carrier;

a reflecting unit disposed in the carrier and comprising:
a first mirror comprising a first normal line and a first reflecting side facing the transparent plate;
a second mirror comprising a second normal line and a second reflecting side facing the first reflecting side; and
a third mirror comprising a third normal line and a third reflecting side facing the second reflecting side to form a reflecting space therebetween;
an image capturing lens set disposed in the carrier; and
an image sensor disposed in the carrier, wherein light from the light source passes through the transparent plate to reach the document, the document reflects the light to reach the first mirror through the reflecting space, the first mirror reflects the light to enter the reflecting space, the light is reflected between the second mirror and the third mirror several times in the reflecting space before the light leaves the reflecting space, and the light leaves the reflecting space and enters the image capturing lens set so as to form an image on the image sensor;
wherein an angle between the first normal line and the document is 45°.

14. The scan device as claimed in claim 13, wherein an angle between the second normal line and the document is 175°, and an angle between the third normal line and the document is −5°.

* * * * *